Aug. 14, 1923.
A. HEIMANN
1,464,846
WEIGHING AND ADVERTISING MACHINE
Original Filed Jan. 22, 1917    4 Sheets-Sheet 2
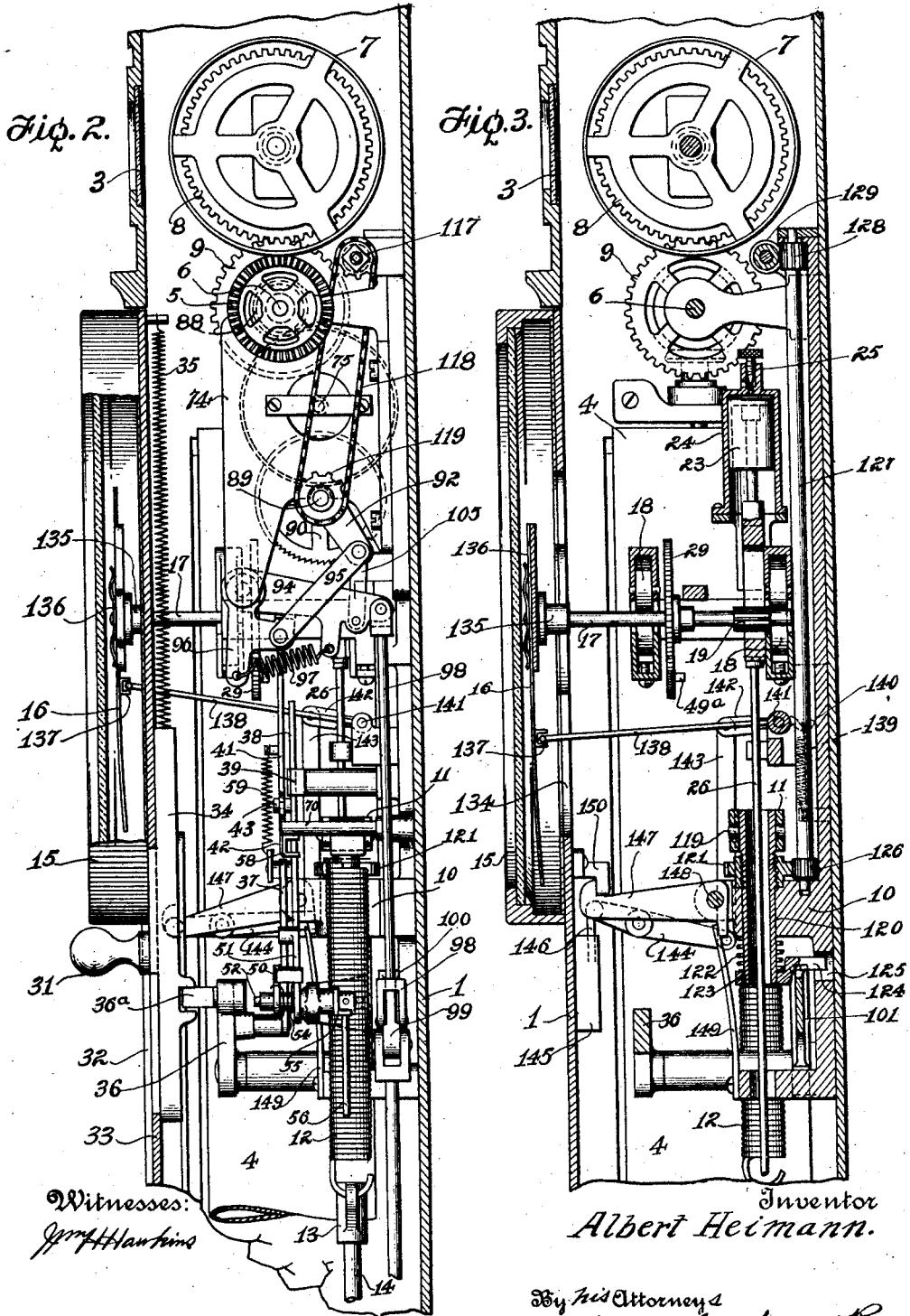
Witnesses:
Jm H Hawkins
Inventor
Albert Heimann.
By his Attorneys
Meyers, Cushman & Rea

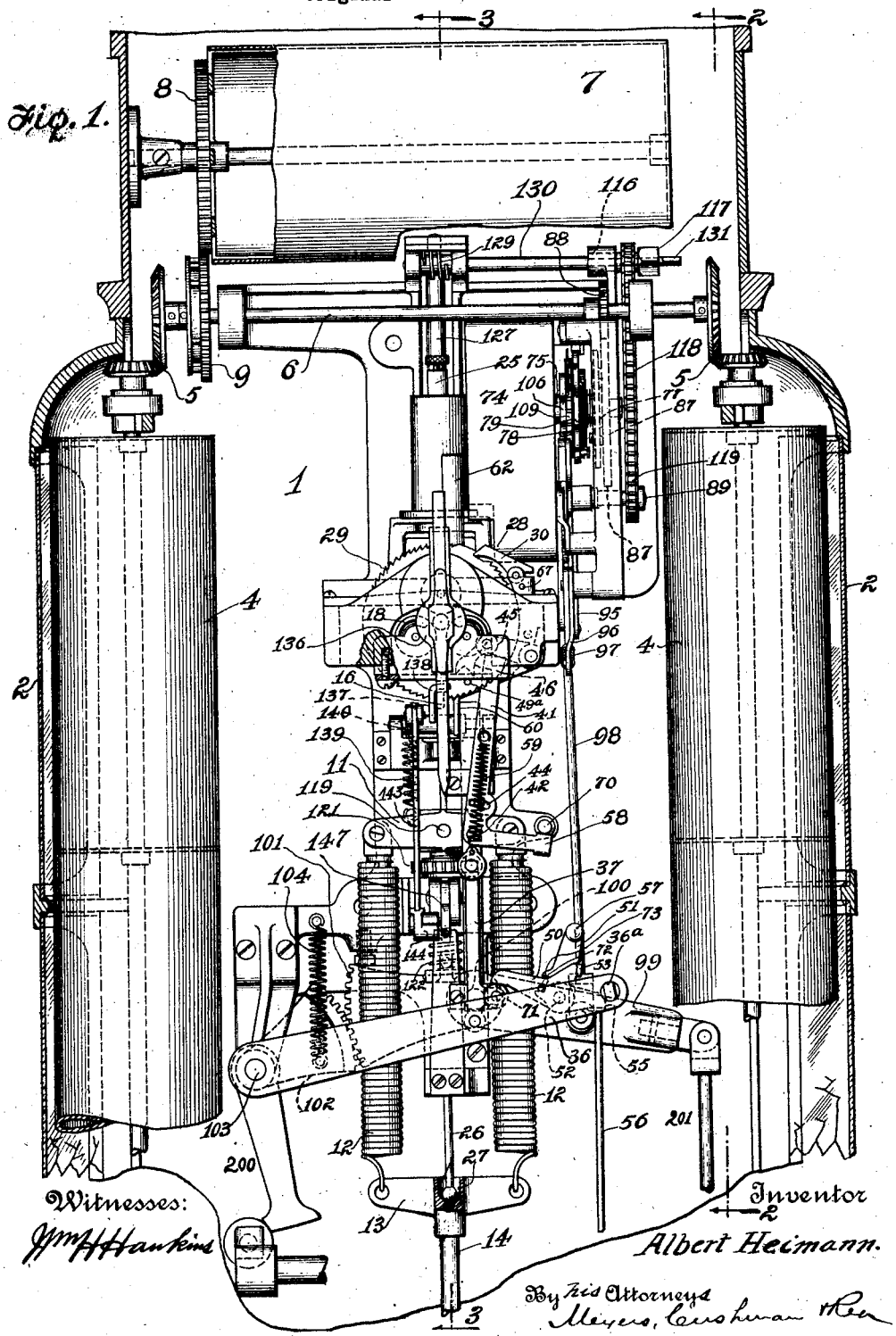

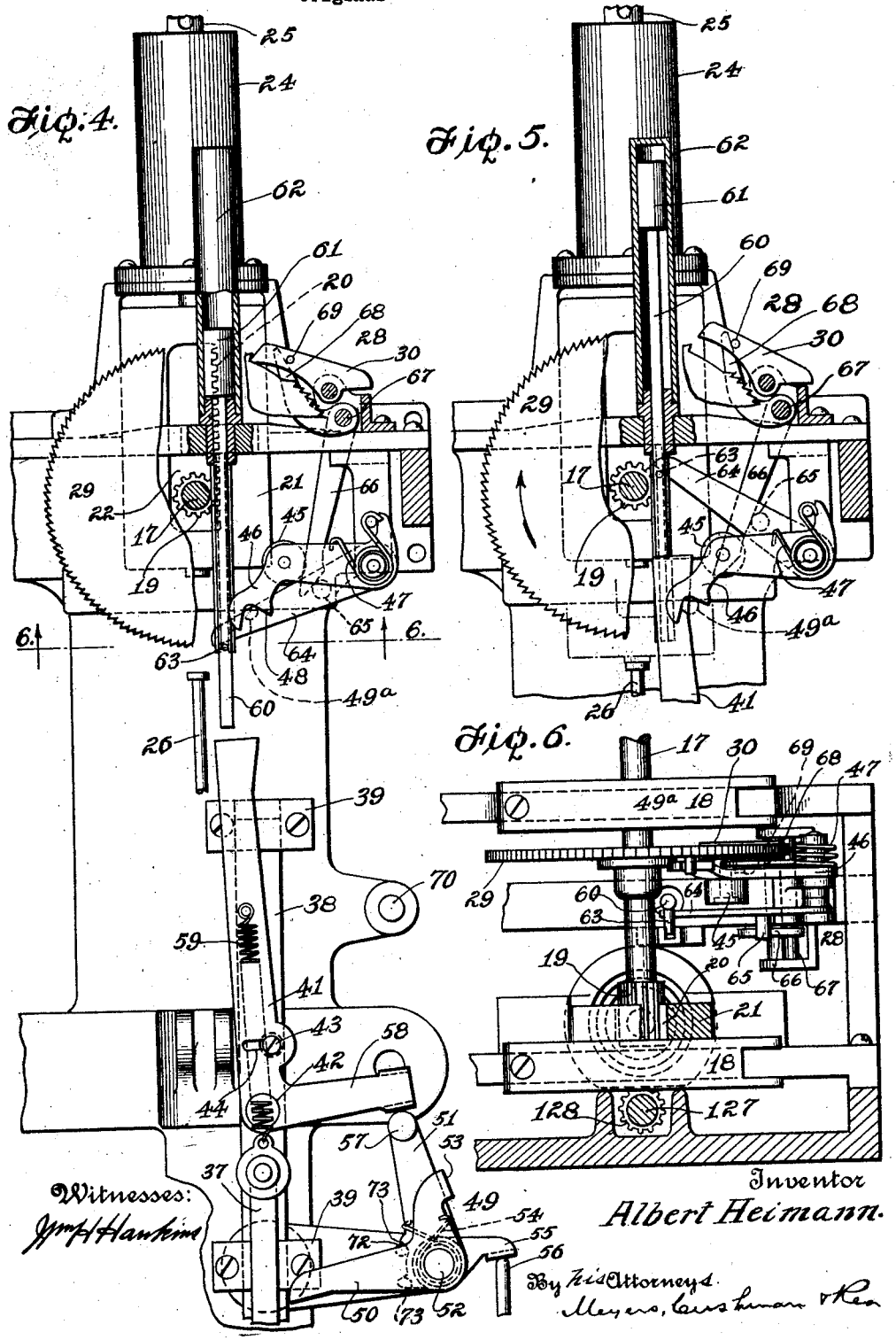

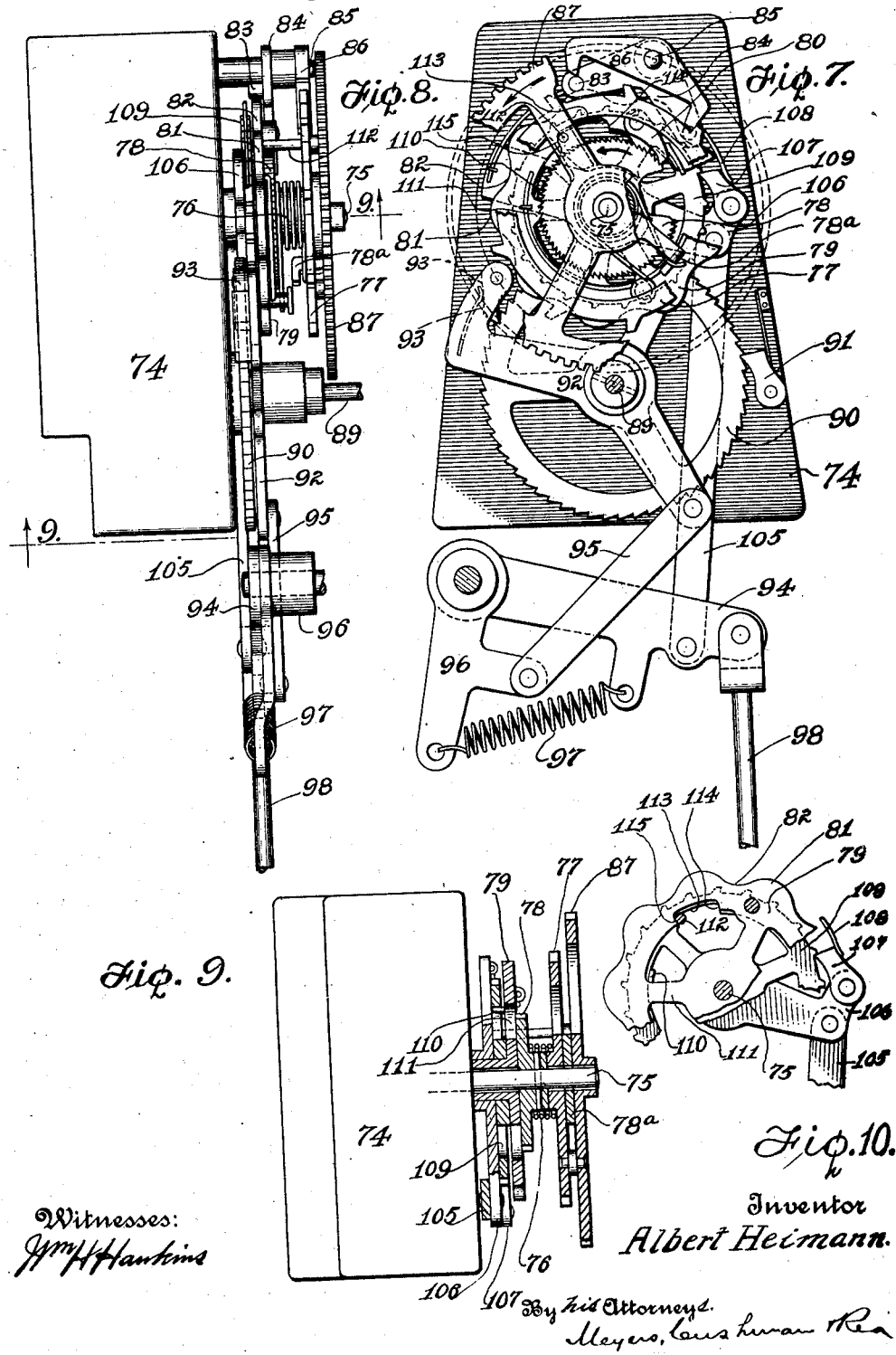

Patented Aug. 14, 1923.

1,464,846

UNITED STATES PATENT OFFICE.

ALBERT HEIMANN, OF NEW YORK, N. Y.

WEIGHING AND ADVERTISING MACHINE.

Application filed January 22, 1917, Serial No. 143,609. Renewed December 23, 1922.

*To all whom it may concern:*

Be it known that I, ALBERT HEIMANN, a citizen of the United States, residing at New York, in the county of New York and State of New York, have invented new and useful Improvements in Weighing and Advertising Machines, of which the following is a specification.

This invention relates to automatic weighing machines and a principal object of the invention is to produce a machine, the mechanism of which is constructed so as to prevent the machine from being operated repeatedly unless a certain part has been previously moved, such for example as a coin controlled part.

A further object of the invention is to produce a combined weighing and advertising machine, constructed and arranged so that a movable advertising device is actuated periodically by a motor and also through the medium of a hand operated member whenever the weighing mechanism is actuated.

A further object of the invention is to provide automatic means for effecting the energizing or rewinding of the motor.

A further object of the invention is to provide very simple means for effecting adjustment of the weighing mechanism.

A further object of the invention is to provide an arrangement whereby when the advertising device is actuated through a hand operated member the operation of the hand operated member winds the motor, and furthermore to construct the parts so as to prevent injury to the motor or to any of the mechanism from repeated actuation of the hand operated member.

A further object of the invention is to construct the machine in such a way as to prevent it from being fraudulently operated.

Further objects of the invention will appear hereinafter.

In the drawing:

Figure 1 is a partial section and front elevation of the upper portion of the machine and showing mechanism which embodies my invention.

Figure 2 is a vertical section through the mechanism, certain parts being broken away, or shown in elevation.

Figure 3 is a view similar to Figure 2 but passing through the vertical center line of the machine.

Figure 4 is a front elevation and partial section showing details of the mechanism for controlling the operation of the indicating mechanism of the weighing machine.

Figure 5 is a view somewhat similar to Figure 4 but showing fewer of the parts and showing them in a different relation.

Figure 6 is a horizontal section taken near the line 6—6 of Figure 4 looking upwardly and showing certain parts broken away.

Figure 7 is an elevation and partial section with certain parts broken away to illustrate the mechanism for controlling the operation of the advertising device.

Figure 8 is a side elevation of the mechanism shown in Figure 7, certain parts being broken away.

Figure 9 is a section taken about on the line 9—9 of Figure 8.

Figure 10 is a detail view.

Referring more particularly to the parts and especially to Figures 1 and 3, 1 represents the case of the machine which is preferably mounted upon a post at the foot of which a weighing platform is mounted, for example in the manner indicated in Figure 1 in my co-pending application, Serial No. 143,610. The case is preferably provided on its sides with bow windows 2 and at an elevated point with a front window 3. Behind the windows 2 are provided two rotatable drums 4 the central shafts of which are rotated through bevel gears 5 or in any other suitable manner from a horizontal counter shaft 6. A similar drum 7 is mounted behind the window 3 and this drum is driven by gear wheels 8 and 9 from the counter shaft 6. These drums 4, 4 and 7 constitute parts of a movable advertising device and their surfaces are divided circumferentially into zones; each zone has a different advertising device.

I provide means for periodically actuating these advertising devices through a motor and also independently of the motor through parts which control the actuation of the weighing mechanism. I shall first describe the preferred form of the weighing mechanism and the indicating mechanism together with the means whereby the operation of the indicating mechanism may be readily controlled through the movement of a coin controlled part. From this arrangement a person standing upon the weighing platform can operate the knob or handle which ordinarily would release the indicating mechanism without producing any effect unless he has previously inserted the proper coin in the machine, except however, that the operation of this knob or handle or other hand operated member whether a coin has been inserted or not, will operate to effect the winding of the motor and may effect the immediate actuation of the advertising device. In order to accomplish this I prefer to provide a supporting bracket 10 attached to the rear wall of the case (see Figure 3) and this supporting bracket supports a fixed crosshead 11, to the oppositely disposed arms of which are attached weighing springs 12, and the lower ends of these springs 12 support a movable or floating crosshead 13 which is carried by the upper end of a weighing rod or bar 14, the lower end of which is connected in any suitable manner with the levers under the weighing platform, which levers and platform it is unnecessary to illustrate, as they may operate in any usual manner. When the person stands upon the platform the springs 12 will be extended and the crosshead 13 will move downwardly a distance proportionate to the weight of the person. This crosshead 13 therefore, constitutes a moving part of the weighing mechanism and I employ it to determine the amount of movement of the indicating needle or pointer of the indicating mechanism.

I shall now describe the indicating mechanism and the manner in which it is controlled by the member 13. Referring particularly to Figures 1, 3 and 4:

The indicating mechanism preferably comprises an indicator dial 15 before which there is mounted an indicating needle or pointer 16 which is carried on the end of an indicating spindle 17. This spindle is preferably mounted between anti-friction rollers 18 (see Figure 3) and carries a pinion 19 which meshes with the teeth 20 of a rack 21, the teeth being formed on the edge of a slot 22 in the rack. The upper end of rack 21 carries damper means which may be in the form of a piston 23 which is received in an air cushioning cylinder 24, and the upper end of the cylinder may be provided with an adjustable needle valve 25 for regulating the admission of air. The lower end of this rack 21 rests upon, but is unattached to a floating stem 26, the lower end of which stem rests in but is unattached to a socket 27, which is formed in the upper side of crosshead 13. When a weight is placed on the weighing platform the crosshead 13 moves downwardly and comes to rest at a lower position and this permits the rack 21 to descend; and through the medium of the pinion 19 this rotates the pointer 16.

I provide means for normally checking the operation of the indicator pointer and this is preferably accomplished by means of a check device 28 comprising a ratchet wheel 29 secured on the indicating spindle 17, and having inclined teeth co-operating with a detent pawl 30. This pawl 30 is normally in the position shown in Figure 4, but it may be moved into the position shown in Figure 5 to release the ratchet wheel 29 and permit the pointer and the ratchet wheel 29 to rotate in the direction indicated by the arrow in Figure 5. When the pawl is in the position shown in Figure 5 the ratchet wheel 29 can rotate but the mechanism which releases the ratchet wheel from the pawl preferably operates in such a way that the ratchet wheel is temporarily held against rotation until the operating handle of the machine returns to its normal position. This is to prevent persons from holding the operating handle or knob fixed at any point and then attempting to weigh more than one person.

I shall now describe the mechanism for controlling the pawl 30 and temporarily detaining the ratchet wheel 29 when the pawl 30 is released, until the handle returns to its normal position. This mechanism is controlled by a movable part, the position of which depends upon whether a coin has been inserted in the machine. The hand operated member referred to above is preferably in the form of a knob 31 which may be moved up and down in a slot 32 in the cover plate or front plate 33 of the machine, said knob being formed on a slide 34 on the inner side of the plate which is normally pulled upwardly by a spring 35. This slide 34 has a socket which engages a dog 36$^a$ on a lever 36 (see Figure 1). When the lever 36 is pulled down it operates through a link 37 (Figure 1) to pull down a slide 38 which is mounted to slide vertically in suitable guides 39. On the upper portion of the slide 38 there is attached a movable part or actuator 41 which is preferably pivotally mounted at 42 on the slide so that a small screw 43 and a slot 44 in the actuator permit a limited pivotal movement of the actuator on the slide. When the slide is in its normal or elevated position the upper end of the actuator 41 engages a roller 45 on a temporary detent pawl 46 and holds the same up as indicated in dotted lines in Figure 1, against the action of a spring 47 which tends to swing the pawl 46 downwardly. If the hand operated member or knob 31 is moved down and back again without the insertion of the proper coin the temporary detent pawl 46 will be thrown into active operation but there will be no release of the normal detent pawl on the return movement of the knob, and hence no weighing, will occur. Any suitable connection may be made from the pawl 46 to the ratchet wheel. In the present embodiment of the invention when the temporary detent pawl 46 is released a V shaped notch 48 in its end engages with a pin 49$^a$ on the ratchet wheel 29 and holds the ratchet against movement; and it will continue to hold it until the actuator 41 returns to its normal position. I control the detents 30 and 46 through the operation of the actuator 41 and I prefer to control the actuator 41 by a trip device 49 which I shall now describe, referring particularly to Figures 1 and 4. This trip device consists of two lever arms 50 and 51 which are pivotally mounted upon a common pin 52 fixed on the frame of the machine. The arm 50 has a projection 53 engaging the edge of the arm 51 to limit a separating angular movement of the arms 50 and 51, and the arms are normally held in this relation by a coil spring 54 disposed around the pin. The arm 51 has a toe 55 against which thrusts a stem 56 which is guided to slide vertically in the machine, this stem being moved in any suitable manner, as for instance by an instrumentality forming part of a different apparatus, an example of which is disclosed in the companion application referred to. If a coin has been inserted in such other apparatus of which stem 56 forms a part and before the slide 38 moves downwardly the stem 56 will move upwardly and will rock the toe 55 toward the left (counterclockwise to the position shown in Fig. 4) and this will bring a dog 57 on the upper end of arm 51 directly into the path of movement of the horizontal arm 58 of the actuator 41, setting the parts ready for the downward movement of the slide. Now when the slide 38 descends, the arm 58 by engaging the dog 57 will rock the actuator 41 towards the left on its pivot 42 pass its center (Fig. 4) and the actuator will remain in this position by reason of a coil spring 59, one end of which is attached to the upper end of the link 37 and the other end of which is attached to the vertical arm of the actuator. This spring is arranged so that when it is in the position indicated in Figure 4 the direction of pull of the spring is on the left of the center of the pivot 42 and so that in the other position of the actuator the spring pulls on the other side of the pivot point; in other words, the spring tends to hold the actuator in either of its two positions. Supposing that a coin has been inserted and the knob 31 has been moved down as far as it will go; the parts will then occupy the position indicated in Figure 4, that is, the upper end of the actuator 41 will come directly under the sliding stem 60 into position to force the stem upwardly upon the return movement of the slide which takes place when knob 31 is released. In order to form a damper for its movement the upper end of this stem carries a piston 61 sliding in a suitable air cushioning cylinder 62. The upward movement of the stem 60 operates to release the pawl 30 and for this purpose I prefer to provide the stem 60 with a laterally projecting pin 63. When the stem 60 slides up the pin 63 engages a lever 64, and a pin 65 on the side of this lever moves a lever 66 so as to rock its shaft 67 and a lifting toe or arm 68 carried by this shaft 67 releases the pawl 30 by engaging a pin 69 on the side of the pawl. Figure 5 shows these parts when the slide 38 has nearly reached the limit of its upward movement, and as the limit of this upward movement is approached the arm 58 strikes a fixed stud 70 operating as a trip, the continued movement then causing this stud to throw the actuator toward the right (see Figure 1). As the actuator moves towards the right it engages the roller 45 to raise and hold up the temporary detent pawl 46. Furthermore, as the slide 38 reaches the limit of its upward movement a roller 71 on the link 37 engages the arm 50 and rocks it toward the right (see Figures 1 and 4). The rocking movement of the lever 50 is imparted through spring 54 to the arm 51 so that the arm 51 is then moved to its normal or inoperative position wherein the dog 57 is out of the path of the arm 58 of the actuator 41. A small stop-pin 72 co-operates with shoulders 73 on the arm 51 to limit the movement of the arm 51 in either direction and furthermore the two arms 50—51 are constructed so as to hold themselves in either position in which they are left.

I prefer to provide a motor for driving the drums 4, 4 and 7 of the advertising device, and this motor operates in such a way that it periodically causes the forward rotation of the advertising drums. This is preferably effected through the medium of an escapement wheel and a spring, the mode of operation being that the motor places the spring under stress and then the escapement wheel is permitted to make a forward rotation, which is transmitted to the advertising drums. In order to accomplish these results the motor 74 is provided with an hour shaft 75, that is a shaft which rotates at some predetermined speed. As this shaft 75 rotates, it places in stress a coil spring 76, one end of which is driven by the shaft 75 and the other end of which is connected with an escapement wheel 77. The end of the spring 76 which is connected with the shaft 75 is preferably attached to a cam wheel 79 which is rigid on the shaft 75. The other end of the spring is attached to an arm 78ᵃ (see Figure 7) that is clamped friction tight between the wheels 77 and 87. When the shaft 75 rotates, at the same time that it is putting the spring 76 in stress it is also rotating cam wheel 79 through the medium of a pawl 80 which is pivotally attached to the cam wheel and which engages the teeth of the ratchet wheel 78. This cam wheel 79 has a wavy edge with alternating projections 81 and hollows or recesses 82. This wavy edge engages pins 83 on a rocker 84 which is rigid on a rock shaft 85 which carries a verge 86. About the time that the spring 76 has been placed under stress the cam comes into such a position that it will move the rocker 84, for example, as in Figure 7 the rocker 84 will be rocked toward the left so as to rock the verge 86 on its rock shaft 85 and cause the verge to release the escapement wheel; and the escapement wheel will then rotate through one tooth space. This movement of the escapement wheel causes a forward rotation of a gear wheel 87 which is loose on the end of the shaft 75 but which is rotated with the escapement wheel, the gear wheel 87 meshes with a gear wheel 88 on the aforesaid shaft 6 which imparts rotation to the advertising drums.

I provide means for effecting the winding up of the motor 74 automatically by the actuation of the hand actuated member 31. For this purpose the motor 74, which may be an ordinary spring motor is provided with a winding shaft 89 carrying a large ratchet wheel 90 with which co-operates a spring pressed pawl 91 for maintaining the spring in its wound up condition. In order to rotate the ratchet wheel 90 to wind up the spring, the shaft 89 is provided with a pawl carrier 92 carrying a pawl 93 which engages the ratchet wheel, and this pawl carrier is rocked to and fro through the operation of the lever 36. In order to impart this movement from the lever 36, I prefer to provide a rocker 94 which operates the pawl carrier 92 through a link 95 and a loose arm 96 which is connected to the lever 94 by a spring 97. A link 98 may impart an upward movement to the lever 94 and this exerts tension in the spring 97 which operates the rocker 92. In order to operate the link 98 its lower end is connected with a lever 99 which is pivoted at 100 and formed as an arm of a segment 101 which meshes with a segment 102 rigidly attached to a shaft 103 which carries the lever 36; a spring 104 restores this lever 36 to its normal elevated position.

The cam 79 may normally be actuated at any time through the operation of the hand operated knob 31. To accomplish this I provide the rock-lever 94 with a link 105, the upper end of which is pivotally attached to a pawl carrier 106 which carries a pawl 107, and this pawl is pressed by a spring 108 so that it may engage the teeth of a hand actuated ratchet wheel 109. This hand actuated ratchet wheel 109 has a flexible or lost motion connection with the cam 79 so that the ratchet wheel may actuate the cam. For this purpose I provide a pin 110 on the ratchet wheel which may engage the edge of a spoke 111 of the cam (see Figures 7 and 9). The ratchet wheel 109 is periodically rotated by the escapement wheel 77 so as to keep the pin 110 close up behind the spoke 111, that is, in the position shown in Figure 7. This is effected through the medium of a long pin 112 which is rigid with the escapement wheel and which extends inwardly towards the motor 74 parallel with the shaft 75, and with its inner end received freely and movably in a short circumferential slot or notch 113 in the hand actuated ratchet wheel 109. Now if the ratchet wheel 109 is actuated by hand with the parts in the position shown in Figure 7, the pawl 107 will move back and catch a tooth and on its return movement will engage that tooth and rotate the ratchet wheel 109 so that the pin 110 will rotate the cam. This will leave the ratchet wheel 109 in a forwardly rotated position with respect to the long pin 112, that is, the shoulder 114 at the right hand end of the slot 113 will lie substantially against the pin 112. Now if it is immediately attempted to actuate the ratchet wheel 109 again through the medium of the link 105, the pawl 107 will slide back until it strikes the next tooth on the ratchet wheel 109 but it will not be able to pass over and effectively engage this tooth because there will be nothing to prevent the ratchet wheel 109 from rotating toward the right; in other words, the pawl 107 can actuate the ratchet wheel when the long pin 112 is near the forward end of the slot 113 and against the shoulder 115 formed by the forward end of the slot, because this shoulder will offer a resistance to the backward rotation of the ratchet wheel and permit the pawl 107 to pass over and effectively engage the next tooth of the ratchet wheel. Of course, when the ratchet wheel 109 is actuated by hand in this way, the pin 110 will advance the cam 79 and effect the release of the escapement wheel which will cause a movement of the advertising drums; hence, if the parts are in the position shown in Figure 7, it is evident that the hand operated member 31 can operate the advertising device once, but no injury can be done to the advertising device by repeated actuation of the knob 31.

When the motor is simply driving the cam the escapement wheel 77 periodically advances and at each advance, the long pin 112 comes up against the shoulder 115 and rotates the ratchet wheel 109; and this keeps the pin 110 up against the spoke. In other words, the escapement wheel causes the ratchet wheel 109 to follow up the cam.

Whenever the weighing mechanism is actuated and the pawl 30 has been raised, the stem 60 will gradually gravitate back to its normal lowest possible position, (see Figure 4) as the air leaks past the piston 61. About the time that the crosshead 13 comes to rest, that is, when the pointer 16 comes to rest, the pawl 30 will come back into engagement with the teeth of the ratchet wheel 29 and will thereafter permit the pointer to return to zero but will not permit the machine to weigh another person until the pawl 30 is again released through the medium of a proper coin.

As will be understood, return of ratchet wheel 29 to its normal position is not prevented by pawl 46, this pawl being held out of the path of movement of pin 49ª by actuator 41 until knob 31 is again moved downwardly, whereupon pawl 46 again engages pin 49ª.

I prefer to construct the machine so that the motor 74 may be wound up by hand independently of the hand operated knob 31. In this connection reference is had particularly to Figure 1. In the upper part of the machine there is mounted a tubular stub shaft 116, the end of which is formed into an angular head 117 to which a wrench may be applied. By rotating this head 117 motion is transmitted through a sprocket chain 118 to a sprocket wheel 119 on the winding shaft 89 of the motor.

I prefer also to construct the parts so that the weighing scales can be adjusted readily from the outside of the machine. In order to accomplish this I prefer to mount the fixed crosshead 11 on pivots 119 (see Figure 3) which are formed on the upper end of a tubular adjusting stud 120 which is guided vertically in the aforesaid bracket 10. Through this stud or sleeve the aforesaid stem 26 passes upwardly. The upper portion of this sleeve 120 is threaded so as to receive an adjusting nut 121, the lower side of which is seated on the upper side of the bracket 10. A spring 122 around the lower end of the sleeve thrusts against the under side of the bracket and also thrusts against a collar 123 attached to the lower end of the sleeve. This collar 123 has a laterally projecting finger 124 which extends into a socket 125 to keep the sleeve from rotating when the adjusting nut 121 is rotated. Evidently, if the adjusting nut 121 is rotated in one direction it will elevate the fixed crosshead 11 and if rotated in the other direction the spring 122 will pull down the crosshead. In order to rotate the adjusting nut 121 I provide it with gear teeth so that it virtually forms a gear wheel, and meshing with it, there is a pinion 126 disposed at the lower end of a spindle 127, the upper end of which carries a small worm wheel 128. This worm wheel 128 may be rotated by means of a worm 129 attached on the inner end of a shaft 130 which has a reduced extremity terminating in a flattened head 131 adjacent to the head 117, and to which an ordinary wrench may be applied.

I prefer to construct the cover plate 33 so that it lies behind the plane in which the pointer 16 rotates and I prefer to provide an opening 134 which will pass over the pointer when the pointer is in an unextended position, and I provide means for extending the pointer after the cover plate has been placed in position. For this purpose I prefer to mount the pointer 16 so as to slide longitudinally in a holder or pointer head 135 which is secured on the end of the spindle 17. On the head 135 a spring plate 136 or similar means may be provided for frictionally engaging the pointer to hold the same in place, at the same time permitting the pointer to be slid out or extended, or slid inwardly into a less extended position. In order to slide out the pointer after the cover has been placed in position, I prefer to provide the inner side of the pointer with a socket 137 which when the cover is placed in position engages the end of a long arm 138 which is normally held in an elevated position by a spring 139 which engages a hook 140 beyond the rock shaft 141 which supports the arm 138. This rock shaft 141 has a short arm 142 to which a link 143 is attached and the lower end of the link 143 is attached to a lever 144, one end of which lies near a lock 145 attached on the inner side of the cover plate, and having a locking bolt 146 which may be projected upwardly by means of a key inserted in the lock from the exterior. When this locking bolt 146 is extended it rocks the lever 144 so as to pull down the link 143 and this pulls down the arm 138 and extends the pointer 16. Furthermore, I provide means whereby this locking bolt will lock the cover plate against removal. For this purpose I prefer to provide a hook or latch arm 147 which is pivoted at 148 and pressed by a leaf spring 149 downwardly. The hook end of this arm 147 normally lies against the end of the bolt 146. When the cover plate is placed in position and a locking key inserted in the lock, the upward movement of the locking bolt 146 moves the arm 147 upwardly so that the hooked end engages a catch 150 attached to the rear side of the cover plate, and this prevents the cover plate from being pulled outwardly until the lock bolt is withdrawn by means of the key. Of course, other fastening means are provided at other points of the cover, if desired.

I shall now briefly explain the general mode of operation of the machine.

A person desiring to be weighed stands upon the weighing platform and this pulls down the floating crosshead 13 and extends the springs 12; this of course, causes a depression of the floating crosshead 13 to a point depending upon the amount of the weight. Unless a coin has been inserted no weight will be indicated at the dial for the reason that although the stem 26 may move downwardly the check pawl 30 will prevent the ratchet wheel 29 from rotating and consequently the pointer at the dial will not rotate. If, however, the person standing on the platform has inserted the proper coin and then moves down the operating knob 31, the arm 36 in moving downwardly will cause an upward movement of stem 56. The upward movement of stem 56 (see Figures 1 and 4) will rock the arm 51 over toward the left. In addition to this, through the medium of the link 37 the lever 36 will pull down the slide 38 and with it the movable actuator 41, and near the latter part of its downward movement the arm 58 of the actuator will engage the dog 57 on the arm 51 and this will trip and rock the actuator 41 toward the left and into the position in which it is shown in Figure 4. This will bring the upper end of the vertical arm of the actuator directly under the lower end of the stem 60. Now when the knob 31 is released it moves upwardly again under the action of the springs 35 and 104; hence, the slide 38 will move upwardly, and as it moves upwardly the spring 59 holds the actuator 41 in its active position as in Figure 4; hence, in its upward movement the actuator 41 will move the stem 60 upwardly; as the stem 60 moves upwardly, its lateral pin 63 actuates the lever 64, and through pin 65 actuates the levers 66 and 68 which lift the check pawl 30 off the ratchet wheel 29; after check pawl 30 has been raised, ratchet wheel 29 is held only by engagement of pawl 46 and pin 49ª, and this engagement is broken by the shift in position of actuator 41 by trip 70 as the slide reaches the upper extreme of its movement. Release of the ratchet wheel 29 of course, permits the rack 21 to descend by gravity until the rack rests upon the upper end of the stem 26, the position of which is determined by the amount of the weight on the weighing platform; the speed of descent of the rack is controlled by means of the air cylinder 24 and air valve 25. The air cylinder 62 operates as a damper or check to prevent the immediate return of the stem 60 from the elevated position in which it is left by the upward movement of the actuator 41 and this prevents the pawl 30 from descending immediately into engagement with the ratchet wheel 29. However, at about the time that the pointer 16 will have ceased to vibrate, the pawl 30 will return into engagement with the ratchet wheel 29 and prevent any further movement of the indicating pointer. The printed directions to the person using the machine will be to the effect that the knob should be moved down and then released. In case it is attempted, however, to commit a fraud by holding the knob in its return movement at a point where the pawl 30 would be held off of its ratchet wheel, I provide the temporary holding means or pawl 46; this pawl is normally held up in an inactive position (see Figure 1) but when the actuator 41 moves down the pawl engages the pin 49ª (see Figures 4 and 5) and operates as a temporary detent device to prevent the actuation of the indicating mechanism of the instrument until the actuator has returned to its normal position of rest. In the upward movement of the actuator and at about the end of its upward movement, the horizontal arm 58 thereof strikes the fixed pin 70 which moves the actuator over so that the upper end of its vertical arm strikes the roller 45 and thereby moves the detent pawl 46 up and holds it in its inactive position.

Each depression and release of the knob 31 gives a downward and upward movement to the link 98 which through the lever 94 and spring 97 actuates the rocker 92, and this winds up the spring motor 74 by rotating the winding shaft 89.

The details of the mode of operation of the mechanism for controlling the rotation of the advertising drums have been already described but will be now again briefly set forth.

The rotation of these drums is controlled by the escapement wheel 77 co-operating with a verge 86. Whenever the lever 94 is actuated, the pawl 107 is operated and this may produce the rotation of a hand operated ratchet wheel. This may actuate the cam 79 which controls the verge 86 and causes a release of the escapement wheel; the escapement wheel is rotated in this way by means of a spring 76 which is constantly being placed under stress by the rotation of the hour shaft 75 of the motor. In addition to actuating the advertising drums through the medium of the knob 31 they are also actuated periodically by the motor mechanism which operates to continuously rotate the cam 79; and the cam driven in this way by the clock periodically actuates the verge 86 to release the escapement wheel 77 and cause the rotation of the drums.

By reason of the fact that one end of spring 76 is attached to a friction tight arm 78ª, it is evident that by moving the arm slightly forward or back (with respect to the direction of rotation,) the stress in the spring may be adjusted or regulated.

It is to be understood, of course, that where the machine involves more than a single instrumentality with the several instrumentalities controlled by the admission of a single coin—as for instance is pointed out in the companion application referred to—but one manually-operable member—as for instance knob 31—need be employed. This feature is disclosed herein, lever 36 forming an operating lever common in both mechanisms, the member 200 (shown as depending from shaft 103 in Fig. 1) being an operating mechanism in the instrumentality disclosed in the companion application, said member 200 being operative with movement of knob 31 to depress the roller on the end of rock arm 202, an operating part of said instrumentality of the companion application. This inter-relation is also disclosed in Fig. 1 by making possible the movement of rod 98 by the movement of lever 99 through connection 201 leading from the other instrumentality to lever 99.

It is understood that the embodiment of the invention set forth herein is only one of the many embodiments or forms the invention may take, and I do not wish to be limited in the practice of the invention nor in my claims to the particular embodiment set forth.

The general combination disclosed herein of a weighing machine and changeable exhibitor is not specifically claimed herein, this general combination forming the subject matter of a divisional application filed May 5, 1919, Serial No. 295,149.

What I claim is:

1. In an automatic weighing machine, in combination, indicating mechanism for indicating weight, weight responsive mechanism for controlling the actuation of the indicating mechanism, a check device for normally holding said indicating mechanism against being actuated, a movable member and an actuator movably carried thereby for moving said check device to release the indicating mechanism therefrom, and a part adapted to connect with a coin receiving mechanism for controlling the position of said actuator and for placing the actuator in a position in which it will move the said check device to effect the release of the said indicating mechanism.

2. In an automatic weighing machine, in combination, indicating mechanism for indicating weight, weight responsive mechanism for controlling the actuation of the indicating mechanism, a check device for normally holding said indicating mechanism against being actuated, a movable member and an actuator movably carried thereby for moving said check device to release the indicating mechanism therefrom, and a part adapted to connect with a coin receiving mechanism for controlling the position of said actuator and for placing the actuator in a position in which it will move the said check device to effect the release of the said indicating mechanism, and a detent for temporarily preventing the operation of said indicating mechanism until the said check device is released.

3. In an automatic weighing machine, in combination, indicating mechanism for indicating weight, weight responsive mechanism for controlling the actuation of the indicating mechanism, a check device for normally holding said indicating mechanism against being actuated, a movable member and an actuator movably carried thereby for moving said check device to release the indicating mechanism therefrom, and a part adapted to connect with a coin receiving mechanism for controlling the position of said actuator and for placing the actuator in a position in which it will move the said check device to effect the release of the said indicating mechanism, a detent for temporarily preventing the operation of said indicating mechanism, said actuator normally holding said detent against operating, and releasing said detent when said movable member is actuated.

4. In an automatic weighing machine, in combination, indicating mechanism for indicating weight, weight responsive mechanism for controlling the actuation of the indicating mechanism, a check device for normally holding said indicating mechanism against being actuated, a hand actuated movable member and an actuator movably carried thereby, said check device having a movable part in the path of said actuator when it moves with said movable member for actuating said check device to release the indicating mechanism therefrom, and a part adapted to connect with a coin receiving mechanism for placing the actuator in a position in which it will move said check device to effect the release of the said indicating mechanism.

5. In an automatic weighing machine, in combination, indicating mechanism for indicating weight, weight responsive mechanism for controlling the actuation of the indicating mechanism, a check device for normally holding said indicating mechanism against being actuated, a hand actuated member mounted to move in one direction and return, an actuator movably carried thereby and a part adapted to connect with a coin receiving mechanism for controlling the position of said actuator and operating to place said actuator in a position in which it will, during the return movement of said member, move said check device to effect the release of the said indicating mechanism.

6. In an automatic weighing machine, in combination, indicating mechanism including a pointer for indicating weight, weight responsive mechanism for controlling the actuation of said indicating mechanism, a check device for normally holding said indicating mechanism against being actuated, a hand actuated movable member and an actuator movably carried thereby, said check device having a movable part in the path of said actuator when it moves with said movable member for actuating said check device to release the indicating mechanism therefrom, a part adapted to connect with a coin receiving mechanism for placing the actuator in a position in which it will move said check device to effect the release of the said indicating mechanism, a temporary detent for holding said pointer against rotation, and means for normally holding said actuator in a position to restrain said temporary detent and thereby prevent said temporary detent from holding said pointer against movement.

7. In an automatic weighing machine, in combination, indicating mechanism including a pointer for indicating weight, weight responsive mechanism for controlling the acuation of said indicating mechanism, a check device for normally holding said indicating mechanism against being actuated, a hand actuated movable member and an actuator mounted to rock thereupon into either of two positions, yielding means for yieldingly holding said actuator in either of two positions, said check device having a movable part in the path of said actuator when in one of said positions when it moves with said movable member, for actuating said check device to release the indicating mechanism therefrom, and a part adapted to connect with a coin receiving mechanism for moving the actuator into one of said two positions and in which it will move said check device to effect the release of the said indicating mechanism.

8. In an automatic weighing machine, in combination, indicating mechanism including a pointer for indicating weight, weight responsive mechanism for controlling the actuation of said indicating mechanism, a check device for normally holding said indicating mechanism against being actuated, a hand actuated movable member and an actuator mounted to rock thereupon into either of two positions, yielding means for yieldingly holding said actuator in either of two positions, said check device having a movable part in the path of said actuator when in one of said positions when it moves with said movable member, for actuating said check device to release the indicating mechanism therefrom, a part adapted to connect with a coin receiving mechanism for moving the actuator into one of said two positions and in which it will move said check device to effect the release of the said indicating mechanism, and a temporary detent for holding said pointer against rotation, said yielding means normally holding said actuator in the position to restrain said temporary detent.

9. In an automatic weighing machine, in combination, weight responsive mechanism, a movable element, means for controlling the position of said element by said mechanism, an indicator including a spindle, indicator controlling means for rotating said spindle, provisions operative on said spindle to prevent rotation thereof, manually operative means for releasing said provisions and means adapted to be coin operated for controlling the operation of said manually operable means.

10. In an automatic weighing machine, in combination, weight responsive mechanism, a movable part mounted so that it tends to move toward said mechanism, said movable part unattached to and supported by a part of said mechanism, so that the position of said movable part is determined by the weight being weighed by said mechanism, an indicator, a spindle connected to said indicator and rotated by said movable part, means associated with the spindle to prevent rotation thereof, manually operable means for releasing said spindle-connected means, and means adapted to be coin operated for controlling the operation of the manually operable means.

11. In an automatic weighing machine, in combination, weight responsive mechanism, a movable part mounted and actuated so that it tends to move by gravity toward said mechanism, said movable part unattached to and supported by a part of said mechanism, so that the position of said movable part is determined by the weight being weighed by said mechanism, an indicator, a spindle connected to said indicator and rotated by said movable part, means associated with the spindle to prevent rotation thereof, manually operable means for releasing said spindle-connected means, and means adapted to be coin operated for controlling the operation of the manually operable means.

12. In an automatic weighing machine, in combination, weight responsive mechanism, a rack, a movable part supporting said rack and mounted so as to gravitate towards said mechanism, said movable part unattached to and supported by a part of said mechanism so that the position of said movable part is determined by the weight being weighed by said mechanism, a dial, a pointer cooperating with said dial to indicate the weight, a pinion meshing with said rack for actuating the said pointer, means operative on said pinion to prevent rotation thereof, and manually operable means for releasing said rotation-preventing means.

13. In an automatic weighing machine, in combination, weight-responsive mechanism, a rack, a movable part supporting said rack and mounted so as to gravitate towards said mechanism, said movable part unattached to and supported by a part of said mechanism so that the position of said movable part is determined by the weight being weighed by said mechanism, a dial, a pointer co-operating with said dial to indicate the weight, a pinion meshing with said rack for actuating the said pointer, means operative on said pinion to prevent rotation thereof, means for releasing said last named means to permit rotation of the pinion, and means for dampening the movement of said pointer.

14. In an automatic weighing machine, in combination, weight responsive mechanism, a rack, a movable part supporting said rack consisting of a floating stem resting on and supported at its lower end by a part of said mechanism so that the position of said movable part is determined by the weight being weighed upon said mechanism, a dial, a pointer cooperating with said dial to indicate the weight, a pinion meshing with said rack for actuating said pointer, means operative on said pinion to prevent rotation thereof, and manually operable means for releasing said rotation-preventing means.

15. In an automatic weighing machine, in combination, a member adapted to be connected to a weighing platform, a pair of springs supporting said member, a crosshead supporting said springs, a stud pivotally attached to said crosshead at its middle point, means for preventing the rotation of said stud, a supporting bracket, an adjusting nut having a thread connection with said stud and resting on said supporting bracket to support said stud and means for rotating said adjusting nut from the exterior of the machine.

16. In an automatic weighing machine, in combination, a member adapted to be connected to a weighing platform, a pair of springs supporting said member, a crosshead supporting said springs, a stud pivotally attached to said crosshead at its middle point, means for preventing the rotation of said stud, a supporting bracket, an adjusting nut having a thread connection with said stud and resting on said supporting bracket to support said stud and means for rotating said adjusting nut from the exterior of the machine, said stud having a bore therethrough, a stem supported on said member and passing upwardly through said bore, and indicating mechanism controlled by said stem.

17. In an automatic weighing machine, in combination, a member comprising a floating crosshead and a bar extending downwardly therefrom to be attached to the weighing platform, springs attached to said floating crosshead, a floating stem supported at its lower end on said floating crosshead and unattached thereto, a rack supported on the upper end of said floating stem but unattached thereto, a pinion meshing with said rack and an indicating pointer controlled by said pinion.

18. In an automatic weighing machine, in combination, a member comprising a floating crosshead and a bar extending downwardly therefrom to be attached to the weighing platform, springs attached to said floating crosshead, a floating stem supported at its lower end on said floating crosshead and unattached thereto, a rack supported on the upper end of said floating stem but unattached thereto, a pinion meshing with said rack and an indicating pointer controlled by said pinion, said rack having a slot in which said pinion is located and having said rack formed on the edge of said slot.

19. In an automatic weighing machine, in combination, a case, weighing mechanism within said case, an indicating spindle controlled by said weighing mechanism, a pointer carried by said spindle constructed to slide inwardly on said holder to assume an unextended position, a cover plate having an opening therein to pass over said pointer when in its unextended position when said cover is being put in place on said case, means for locking said cover in place including a locking bolt, and means actuated by said locking bolt for extending said pointer after said cover plate is in place.

20. In an automatic weighing machine, the combination of a member connected to a weighing platform so as to be moved by weight on the platform, spring means for supporting said member, a longitudinally slidable member attached to said spring means, a fixed support and guide for said slidable member, adjusting means mounted on said fixed support and a guide for longitudinally sliding said slidable member to adjust the tension on said spring means, and means for operating said adjusting means from an exterior point of the mechanism.

21. In an automatic weighing machine, an indicator, a spindle carrying said indicator, means for rotating said spindle, means for preventing the rotation of said spindle said means comprising a detent normally operative and a second independent detent normally inoperative, a manually controlled device movable to render the normally operative detent inactive and means for rendering the normally inoperative detent active during the movement of said device.

22. In an automatic weighing machine, indicating means, actuating means therefor, a detent for rendering said actuating means inoperative, a movable actuator adapted to be located in two positions, means for shifting said actuator into operative position, means for thereafter moving said actuator to release said detent and fixed means contacting with said actuator during said releasing movement to return it to inoperative position.

23. In an automatic weighing machine, indicating means, actuating means therefor, a detent for rendering said actuating means inoperative, a movable actuator for releasing said detent, said actuator consisting of a rock arm adapted to be rocked into operative and inoperative positions and held in each position and a rock arm adapted to be rocked into operative position to rock said actuator into operative position during movement thereof; and means for rocking said last named rock arm into inoperative position actuated by the releasing motion of the actuator.

24. In an automatic weighing machine, in combination indicating mechanism, actuating means therefor, means for damping the action of said actuating means, a device for rendering said actuating means inoperative, a temporary release for said device and damping means connected to said release to render it operative after the damping means connected to said actuating means has permitted said actuating means to permanently locate the indicating mechanism in desired position.

25. In a weighing machine, a spindle, an indicator carried thereby, means for rotating said spindle, a detent for preventing the rotation of said spindle, a releasing member, means for moving it in one direction to release said detent, said member being movable in the opposite direction to render said detent operative, and damping means for checking the return of said movable member to permit the indicating means to come to rest.

26. In an automatic weighing machine, a spindle, means for rotating said spindle, a dial through which the spindle passes, an aperture in said dial, a holder adjacent the end of said spindle beyond the dial, a pointer shiftable in said holder and means for shifting said pointer to bring it into register with the aperture in the dial.

27. In an automatic weighing machine, a spindle, means for rotating said spindle, a dial through which the spindle passes, an aperture in said dial, a holder adjacent the end of said spindle beyond the dial, a pointer shiftable in said holder, means for locking said dial in position and means connected to said locking means for shifting said pointer into register with the aperture in the dial.

28. In an automatic weighing machine, in combination, weight responsive mechanism, a rack, a movable part supporting said rack and mounted so as to gravitate toward said mechanism, said movable part unattached to and supported by a part of said mechanism so that the position of said movable part is determined by the weight being weighed by said mechanism, a dial, a pointer cooperating with said dial to indicate the weight, a pinion meshing with said rack actuating the said pointer, means operative on said pinion to prevent rotation thereof, manually operable means for releasing said rotation preventing means and means adapted to be coin operated for controlling the operation of the manually operable means.

In testimony whereof I have hereunto set my hand.

ALBERT HEIMANN.